(12) United States Patent
Keaton et al.

(10) Patent No.: US 11,470,483 B2
(45) Date of Patent: Oct. 11, 2022

(54) DETERMINATION OF DISTRIBUTION OF WI-FI DEVICES WITHIN A LOCAL NETWORK

(71) Applicant: CenturyLink Intellectual Property LLC, Broomfield, CO (US)

(72) Inventors: William J. Keaton, Yardley, PA (US); Brian E. Bond, Fairmont, WV (US); David J. Moore, Lakewood Ranch, FL (US); Kevin W. Lu, Bridgewater, NJ (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 86 days.

(21) Appl. No.: 16/817,059

(22) Filed: Mar. 12, 2020

(65) Prior Publication Data

US 2021/0006984 A1  Jan. 7, 2021

Related U.S. Application Data

(60) Provisional application No. 62/869,936, filed on Jul. 2, 2019.

(51) Int. Cl.
*H04W 16/18* (2009.01)
*H04B 17/318* (2015.01)
(Continued)

(52) U.S. Cl.
CPC .......... *H04W 16/18* (2013.01); *H04B 17/318* (2015.01); *H04W 12/06* (2013.01); *H04W 24/06* (2013.01); *H04W 84/12* (2013.01)

(58) Field of Classification Search
CPC ..... H04W 16/18; H04W 12/06; H04W 24/06; H04W 84/12; H04W 24/02; H04W 24/10;
(Continued)

(56) References Cited

U.S. PATENT DOCUMENTS 9,686,404 B1 * 6/2017 Pan ..................... H04W 12/068
2012/0317619 A1 * 12/2012 Dattagupta ........... H04W 12/50
726/4

(Continued)

OTHER PUBLICATIONS

IEEE Std 802.11—2016, Part 11: Wireless LAN Medium Acces Control (MAC) and Physical Layer (PHY) Specifications (Year: 2016).*

*Primary Examiner* — Huy D Vu
*Assistant Examiner* — Robert Ma (57) ABSTRACT

A wireless testing system is provided that tests Wi-Fi signal strength of devices of a local network to determine distribution of network devices within the local network. In particular, one or more Wi-Fi-based devices may be located within or near a premises in which a wireless network is present. The devices are configured to automatically connect to a particular test broadcast signal from a modem and provide signal strength data. An application may log into or otherwise access the information obtained by the modem concerning the Wi-Fi signal strength of the wireless devices. The application may analyze the Wi-Fi signal strength information and may execute a recommendation engine to provide one or more recommendations/directions for installing components of the wireless network, such as wireless devices, modems, etc. to improve the coverage of the wireless network and provide a more robust wireless experience for devices within the wireless network.

19 Claims, 8 Drawing Sheets

(51) Int. Cl.
*H04W 12/06* (2021.01)
*H04W 24/06* (2009.01)
*H04W 84/12* (2009.01)

(58) Field of Classification Search
CPC .. H04W 12/068; H04W 12/50; H04B 17/318; H04L 43/50
See application file for complete search history.

(56) References Cited

U.S. PATENT DOCUMENTS

| | | | | |
|---|---|---|---|---|
| 2013/0272146 | A1* | 10/2013 | Jones | H04L 43/50 370/252 |
| 2016/0044090 | A1* | 2/2016 | Glickfield | G06Q 10/10 709/204 |
| 2017/0279630 | A1* | 9/2017 | Anderson | H04W 12/068 |
| 2017/0308338 | A1* | 10/2017 | Maeda | G06F 3/1204 |
| 2019/0387415 | A1* | 12/2019 | Scahill | H04W 24/02 |

* cited by examiner

| Wireless Client Table | | | | | |
|---|---|---|---|---|---|
| Device | SSID | Band | Tx Rate | Rx Rate | Rx RSSI |
| Wi-Fi Device A | CTL-Test | 2.4 GHz | 72.22 Mbps | 6 Mbps | -43 |
| Wi-Fi Device B | CTL-Test | 2.4 GHz | 72.22 Mbps | 6 Mbps | -71 |
| Wi-Fi Device C | CTL-Test | 2.4 GHz | 72.22 Mbps | 6 Mbps | -40 |
| Wi-Fi Device D | CTL-Test | 2.4 GHz | 72.22 Mbps | 6 Mbps | -32 |

DETERMINATION OF DISTRIBUTION OF WI-FI DEVICES WITHIN A LOCAL NETWORK

CROSS-REFERENCE TO RELATED APPLICATION

This application is related to and claims priority under 35 U.S.C. § 119(e) from U.S. Patent Application No. 62/869,936, filed Jul. 2, 2019 entitled "DETERMINATION OF DISTRIBUTION OF WI-FI DEVICES WITHIN A LOCAL NETWORK," the entire contents of which is incorporated herein by reference for all purposes.

TECHNICAL FIELD

Embodiments of the present invention generally relate to systems and methods for implementing a telecommunications or data network, and more specifically for testing Wi-Fi signal strength of devices of a local network to determine distribution of network devices within the local network.

BACKGROUND

Telecommunication networks provide for the transmission of information across some distance through terrestrial, wireless or satellite communication networks. Such communications may involve voice, data or multimedia information, among others. In some instances, the telecommunications network may provide Internet access to one or more customers of the network through a wired or wireless interface. For example, the network may provide the customer with a modem that connects to or otherwise provides access to the Internet. The modem may be located at a customer premises, such as a customer's home and place of business. Via the modem, a number of computing devices may access and interact with the Internet to share data with other computing devices. In one particular example, one or more wireless devices may communicate with the modem through a Wi-Fi connection. In general, Wi-Fi is a wireless communication standard that allows for the generation of wireless local area network (WLAN) of devices. A typical WLAN set-up includes a modem that broadcasts a wireless signal to multiple wireless devices and acts as a gateway device to a larger network over which connection to the Internet or other networks is available.

The strength of any wireless signal may vary from application to application. For example, a wireless device located near the broadcasting modem may receive a strong wireless signal while wireless devices located far from the broadcasting modem and/or through various structures (walls, floors, doors, etc.) may have a weak wireless signal. Strong wireless or Wi-Fi signals allow for transmissions of data between the devices to include fewer errors than weaker Wi-Fi signals. In general, the weaker the Wi-Fi signal, the more power the wireless device consumes to receive and transmit the signal and the more likely errors may occur within the exchange of data. At certain Wi-Fi signal strengths, communications between the devices may cease. To ensure adequate connection and communication between the devices, a strong Wi-Fi signal broadcast by the modem device and received at the wireless device is preferred. User experience quickly degrades as the Wi-Fi signal strength lowers.

It is with these observations in mind, among other, that aspects of the present disclosure were conceived.

SUMMARY

One aspect of the present disclosure relates to a method for operating a wireless network. The method may include the operations of receiving, via a network server, a test wireless network identifier and password for connecting to the test wireless network, broadcasting, upon receiving a test initiation signal and based on the test wireless network identifier, a test wireless network signal within a premises, and communicating, upon receiving a password, with a test wireless device via the test wireless network signal. The method may also include the operations obtaining, from the test wireless device, transmission data of the test wireless device over the test wireless network signal and transmitting, to a mobile device and based on a request from an application of the mobile device, the transmission data of the test wireless device.

Another aspect of the present disclosure relates to a wireless network device including one or more processors, a wireless transmitter/receiver in communication with the one or more processors, and a memory comprising instructions. When the instructions are executed by the one or more processors, the instructions perform the operations of detecting, from a wireless network broadcasting device, a test wireless network signal comprising a test wireless network identifier, transmitting, via the wireless transmitter/receiver and to the wireless network broadcasting device, connection credentials associated with the test wireless network identifier to connect to the test wireless network signal, measuring a signal strength of the test wireless network signal based on receiving one or more test communications via the test wireless network signal, and transmitting the signal strength of the test wireless network signal to the wireless network broadcasting device.

Yet another aspect of the present disclosure relates to a wireless network system including a wireless broadcasting device broadcasting, based on a test initiation signal, a test wireless network signal and a wireless device automatically transmitting, upon detection of the test wireless network signal, one or more credential information to the wireless broadcasting device to connect to the test wireless network signal and to transmit a measured signal strength of the test wireless network signal received at the wireless device. The wireless network system may also include a mobile device communicating with the wireless broadcasting device to obtain measured signal strength of the test wireless network signal received at the wireless device and to display the measured signal strength on a display device associated with the mobile device.

DETAILED DESCRIPTION

To improve the use of a WLAN at a customer premises, a general understanding or knowledge of the varying Wi-Fi signal strength within the premises may be beneficial. In particular, knowledge of the Wi-Fi signal strength at various locations within the premises may be used to recommend or determine preferred locations of wireless devices, the modem device or devices, repeaters or signal boosters, and other devices utilized in providing a wireless network signal. The Wi-Fi signal coverage of the premises may thus be improved such that "dead spots" or areas of low Wi-Fi signal strength are lessened. As such, aspects of the present disclosure involve systems, methods, and the like, for testing Wi-Fi signal strength of devices of a local network to determine distribution of network devices within the local network. In particular, one or more Wi-Fi-based devices may be located within or near a premises in which a WLAN is present or a WLAN is to be installed. The devices are configured to scan for and connect to a particular test broadcast signal, such as a signal identified as a test Service Set Identifier (SSID) network. A modem of the WLAN may be configured, either through an update to the modem firmware or as manufactured, to receive an instruction to begin a test of the WLAN and begin broadcasting a Wi-Fi signal with the test SSID network identifier. The Wi-Fi device or devices may, once the test SSID network signal is received, automatically exchange credentials with the modem to link the Wi-Fi devices to the modem.

Once linked, the modem may receive signal strength data from each of the Wi-Fi devices in communication with the modem over the SSID network. An application, such as a mobile application executed on a mobile device, may log into or otherwise access the information obtained by the modem concerning the Wi-Fi signal strength of the wireless devices. The application or the modem may analyze the Wi-Fi signal strength information and may execute a recommendation engine to provide one or more recommendations/directions for installing components of the WLAN, such as wireless devices, modems, etc. For example, the analysis of the Wi-Fi signal strength may indicate a location within the premises at which the Wi-Fi signal is below a particular threshold. To improve the Wi-Fi signal strength at that location, the application or modem may provide instructions to a technician or other installer of the WLAN to move the broadcasting modem device closer to the low Wi-Fi signal strength area. In another example, additional WLAN components may be recommended in particular locations within the premises, such as signal repeaters or extenders, to improve the Wi-Fi signal strength. Further, in some instances information about the premises, such as building material, floor plans, total square footage of the premises, etc., may be provided to the recommendation engine to improve the recommendation/directions provided by the application or modem. In this manner, the Wi-Fi signal strength of the area covered by the WLAN may be increased or analyzed to improve the coverage of the WLAN and provide a more robust wireless experience for devices within the WLAN.

The systems, devices, and methods described herein provide a cost effective solution for mapping Wi-Fi signal strength in a WLAN of a premises. As the results of the signal strengths of the devices of the WLAN are collected at once, individual readings or measurements taken throughout the premises by moving from area to area may be eliminated, increasing the speed at which the Wi-Fi coverage is determined. Further, verifying the strength of the wireless signal throughout the premises may also reduce the number and cost of site visits to repair or improve the WLAN coverage. Also, by providing the results of the WLAN signal strength tests to a technician, network administrator, or a user of the premises, opportunities to request additional Wi-Fi components to improve the network may be gained and a report on the health of the WLAN at the premises may be generated and stored for future use when providing services associated with the premises.

Figure 1:
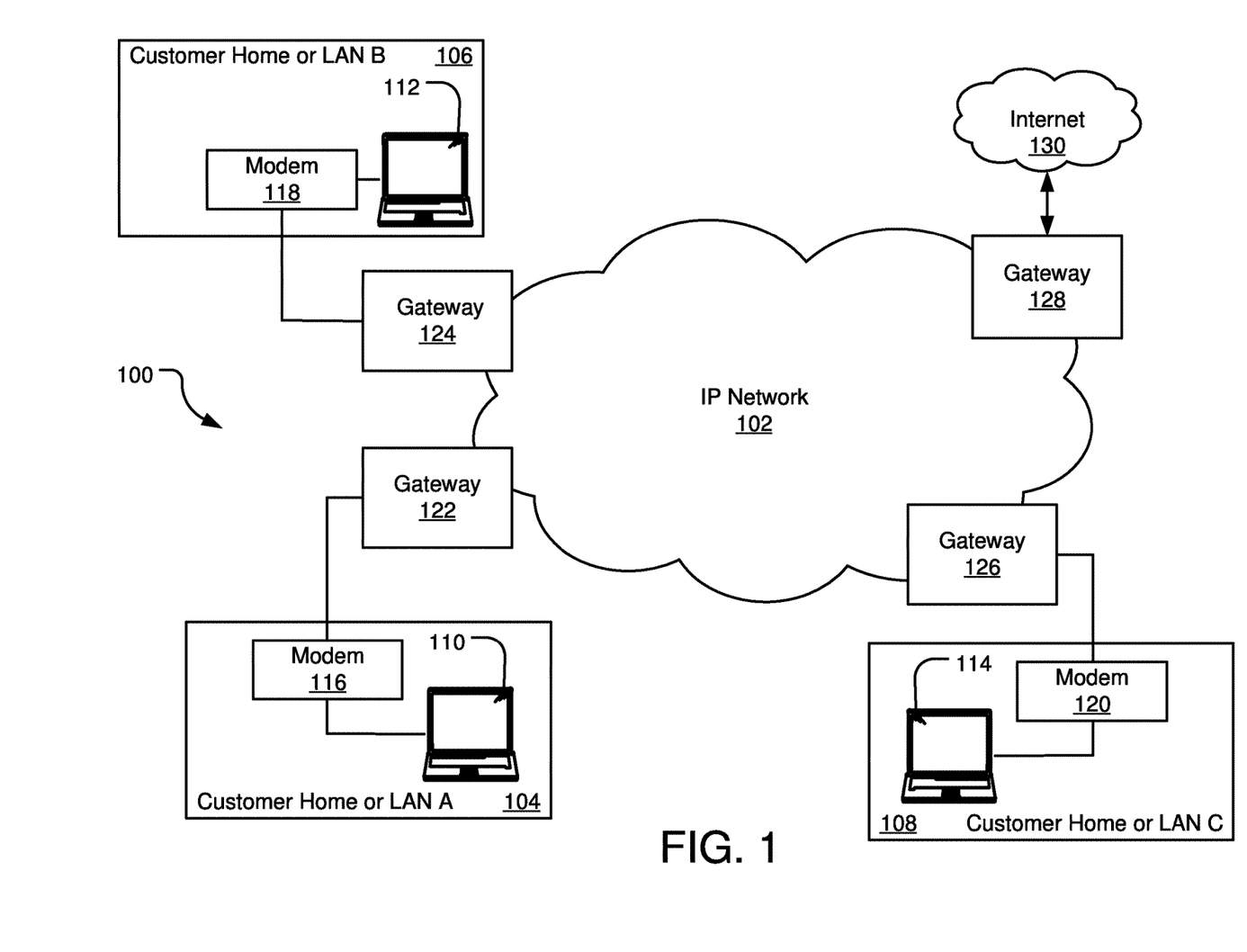
FIG. 1 schematic diagram illustrating an exemplary Internet Protocol (IP) operating environment in accordance with one embodiment.

FIG. 1 schematic diagram illustrating an exemplary Internet Protocol (IP) operating environment in accordance with one embodiment. In general, the environment 100 provides for establishing communication sessions between network users and the Internet 130. In particular, one or more customer networks 104-108 may connect to an IP network 102 to provide and receive communications with the Internet 130. With specific reference to FIG. 1, the environment 100 includes an IP network 102, which may be provided by a wholesale network service provider. However, while the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, route reflectors, and registrars, which enable communication and/or provides services across the IP network 102, but are not shown or described in detail here because those skilled in the art will readily understand these components. Communications between the IP network 102 and other entities or networks, such as the one or more customer home or business local area networks (LANs) 104-108, may also be managed through network environment 100.

Customer networks 104-108 can include communication devices such as, but not limited to, a personal computer, wireless communication device, gaming console, etc., connected to a modem 116-120. Although shown in FIG. 1 as computer 110, the communication devices may include any type of communication device that receives a multimedia signal, such as an audio, video or web-based signal, and presents that signal for use by a user of the communication device. In many cases, the computing device 110 may be a wireless computing device. The communication and networking components of the customer networks 104-108 enable a user at the customer network to communicate via the IP network 102 to other communication devices or the Internet 130. Components of the customer networks 104-108 are typically home- or business-based, but they can be relocated and may be designed for easy portability.

The customer networks 104-108 typically connects to the IP network 102 via respective gateways 122-126 or other network edge devices. In some instances, many such customer networks 104-108 may connect at a single gateway 122-126 such that a gateway may provide an interface to the IP network 102 for several such network 104-108. The IP network 102 may also connect to other networks (collectively known herein as the "Internet" 130) through another gateway 128 or other edge device. In this manner, the IP network 102 may connect customer networks 104-108 to the Internet 130 or other devices/networks associated with the IP network 102.

Figure 2:
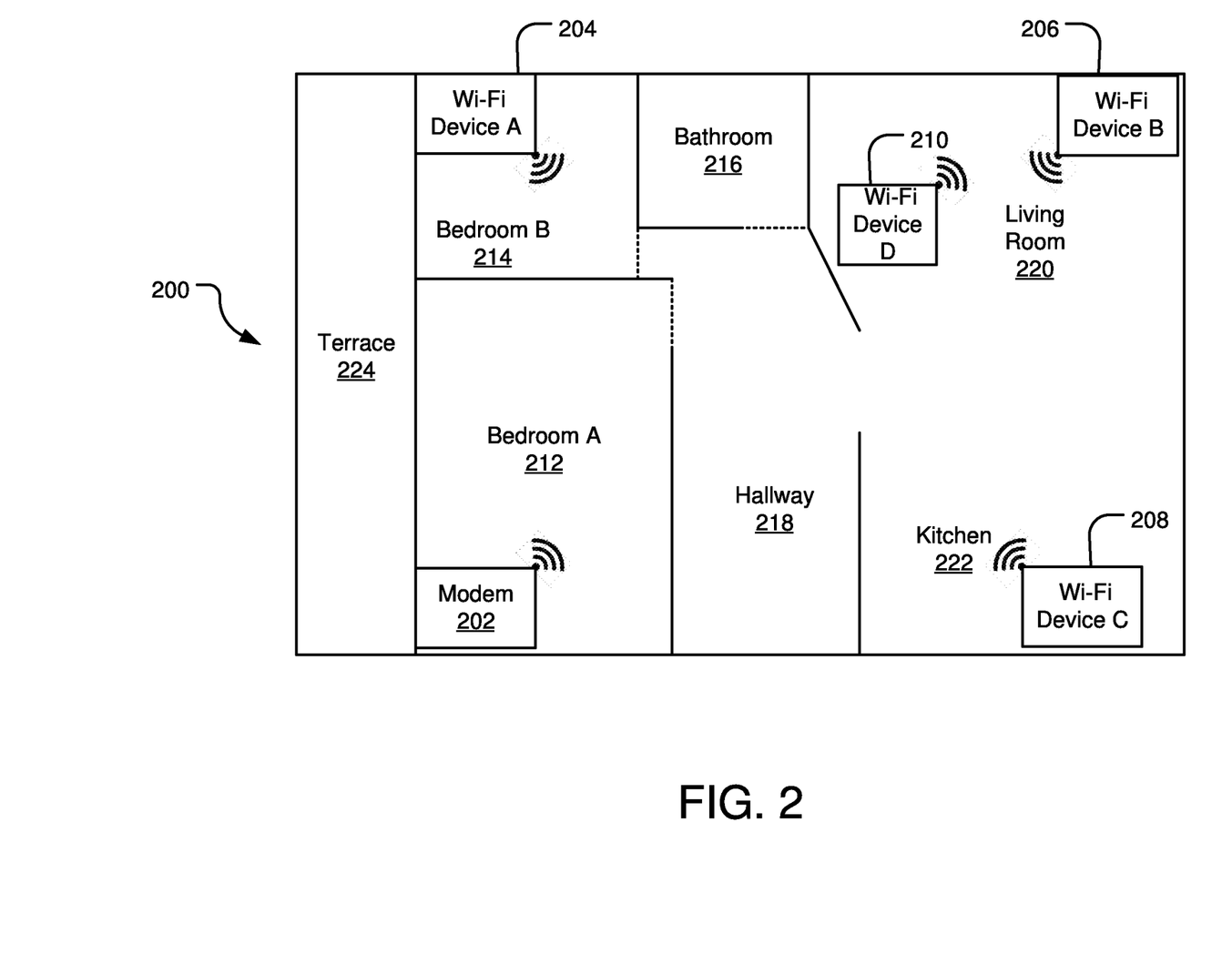
FIG. 2 is a schematic diagram illustrating a distribution of Wi-Fi devices within a floor plan of a home network in accordance with one embodiment.

As mentioned above, the customer networks 104-108 may be part of a home or office network. In some instances, the customer network 104-108 may form a Wireless Local Area Network (WLAN) in which wireless devices may communicate with the network 102 via a modem 116-120 or similar network device. FIG. 2 is a schematic diagram illustrating one such customer premises where a WLAN is established. In particular, FIG. 2 illustrates a distribution of Wi-Fi or other wireless devices 204-208 within a floor plan 202 of a home network in accordance with one embodiment. The premises in which a WLAN is set-up may vary in shape and size, including office buildings, outdoor venues, multi-story homes, apartments, trailers, etc. In general, a customer WLAN network may be established or set-up at any customer premises. The premises 200 of FIG. 2 is used herein as merely an example premises to illustrate some components of a customer WLAN.

The premises 200 of FIG. 2 includes several rooms 212-224, some separated by walls and doors of varying building materials. To create a WLAN within the premises, a modem 202 may be located within a room and connected to the network 102 described above. In some instances, the modem 202 may include a wired connection to the network 102 for exchanging communications with the network 102. The modem 202 may also be configured to broadcast a Wi-Fi network signal. In some instances, the Wi-Fi network signal may include a network identifier, such as an SSID. The modem 202 may broadcast one or more such wireless network signals, each identified by a unique SSID or other network identifier. In general, the broadcast network signal allows for wireless devices, such as Wi-Fi devices A-D 204-210, to communicate with the modem 202 to receive and provide communications to the IP network 102 to/from the wireless devices. Via the modem 202, the Wi-Fi devices 204-208 or other wireless devices within range and allowed access to the modem 202 may communicate with the IP network 102.

Figure 3:
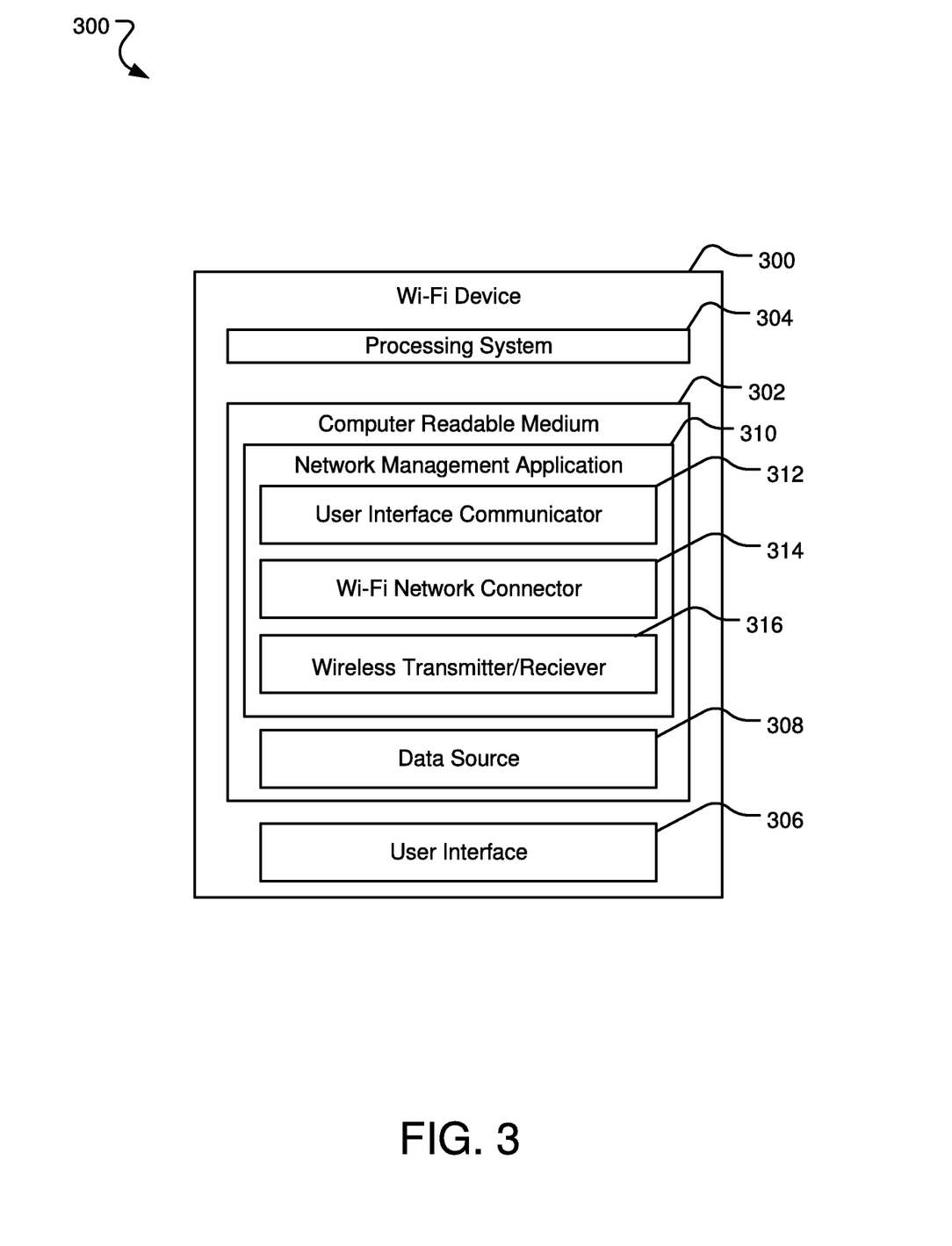
FIG. 3 is a schematic diagram illustrating a Wi-Fi device for use in testing a distribution of such devices within a local network in accordance with one embodiment.

Wi-Fi devices A-D 204-210 may be any computing device that communicates with the modem 202 through a Wi-Fi wireless connection. For example, Wi-Fi devices A-D 204-210 may be, but are not limited to, cellular or smart phones, laptop computers, gaming consoles, web-controlled devices (such as wireless doorbells, light controllers, climate controllers, etc.), Internet of Things (IoT) devices, and the like. In some instances, the Wi-Fi devices 204-208 may be configured to be used for testing of the Wi-Fi signal strength within the premises 200. FIG. 3 is a schematic diagram illustrating one such Wi-Fi device 300 for use in signal strength testing of a WLAN. The Wi-Fi device 300 of FIG. 3 may be the Wi-Fi devices 204-208 shown in FIG. 2. In some instances, a network management application 310 may be executed on the Wi-Fi device 300 to perform one or more of the operations described herein. The network management application 310 may be stored in a computer readable media 302 (e.g., memory) and executed on a processing system 304 of the Wi-Fi device 300 or other type of computing system, such as that described below. The computer readable medium 302 includes volatile media, non-volatile media, removable media, non-removable media, and/or another available medium. By way of example and not limitation, non-transitory computer readable medium 302 comprises computer storage media, such as non-transient storage memory, volatile media, nonvolatile media, removable media, and/or non-removable media implemented in a method or technology for storage of information, such as computer readable instructions, data structures, programs, or other data.

According to one embodiment, the network management system 310 may also provide a user interface 306 (e.g., a command line interface (CLI), a graphical user interface (GUI), etc.) displayed on a display, such as a computer monitor, for displaying data. Through the user interface 306, a user of the network management system 300 may reconfigure or alter the operations of the Wi-Fi device 300, such as through one or more inputs provided through input devices. The input device for providing inputs to the device 300 may include, among others, a keyboard or a pointing device (e.g., a mouse, trackball, pen, or touch screen) to enter data into or interact with the user interface 306.

In one example, the user interface 306 may communicate with other components or portions of the network management application 310 to receive user input for manipulating or otherwise modifying the operation of the network management application. For example, user interface communicator 312 may communicate with user interface 306 to receive one or more user inputs. The user interface 312 may also provide information for display via the user interface 306, such as wireless networks detected by the device 300, connection status to one or more wireless networks, detected wireless signal strength, and the like. As another example, the user interface 306 may receive user input for modifying the number and types of wireless networks to which the device 300 connects. For example, the device 300 may be configured to automatically connect to a test Wi-Fi or other wireless network upon detection of the test wireless network. Configuring the Wi-Fi device 300 to automatically connect to the test wireless network may include receiving configuration instructions or commands through the user interface 306 to add the test network to the list of available networks to the Wi-Fi device 300. In other instances, the operational code or program of the Wi-Fi device 300 may be configured or altered to recognize and connect to the test wireless network signal, in some instances based on the SSID of the test wireless network.

The network management application 310 may also utilize a data source 308 of the computer readable media 302 for storage of data and information associated with the network management system 300. For example, the network management application 310 may store information associated with known wireless networks and connection information to connect to such networks, such as passwords or other connecting credentials to transmit to a modem broadcasting the wireless network signal. In general, any data or information utilized by the security management application 310 may be stored and/or retrieved via the data source 308.

The network management application 310 may also include several components to perform one or more of the operations described herein. For example, a Wi-Fi network connector communicator 314 may be configured to connect to Wi-Fi or other wireless networks when such a network is detected. A wireless network signal may be detected via a wireless transmitter/receiver 316 configured to communicate packets with a wireless transmitting device. In some instances, the Wi-Fi network connector 314 may be configured to automatically transmit connection credentials to a device transmitting a test wireless network signal via the wireless transmitter/receiver 316.

Returning to FIG. 2, the Wi-Fi device 300 of FIG. 3 may be used for testing of a Wi-Fi signal. For example, a network technician or administrator may obtain several Wi-Fi testing devices when visiting the premises 200 during an install of the WLAN at the premises or to fix or update a pre-existing WLAN in the premises. The Wi-Fi devices 204-210 may be off-the-shelf Wi-Fi devices that are modified or altered as testing devices or may be designed and manufactured as testing devices. The obtained Wi-Fi devices 204-210 may be modified to automatically connect to a test SSID when the device is active and the broadcast signal of the test SSID is discovered. For example, the software executed by the Wi-Fi device 204 to operate the device may be accessed and modified to include one or more instructions to automatically connect to a test SSID network signal. The instructions may include the SSID and an auto-connect instruction. The instructions may also include a password that the Wi-Fi device 204 may transmit to the modem 202 upon a request to provide such a password. The connection to the test SSID network signal by the modified Wi-Fi devices 204-210 is described in more detail below. For Wi-Fi devices 204-210 manufactured for testing of the Wi-Fi signal at the premises 200, the software executed to operate the device may be modified or written with similar instructions to cause the Wi-Fi device 204-210 to connect to the test SSID network signal. The updated or modified Wi-Fi devices 204-210 may be provided to technicians or other network administrators for use in conducting Wi-Fi signal strength testing at a premises 200. In other instances, the modified devices 204-210 may be sent to a homeowner or Information Technology (IT) specialist at the premises 200 for self-testing of the WLAN signal strength.

Returning to FIG. 2, a technician, homeowner, IT specialist, or any other person at the premises (collectively referred to herein as "test conductor") may activate and distribute the testing Wi-Fi devices 204-210 in various locations within the premises 200. In some instances, the locations within the premises may be selected based on many factors, such as the location of the modem 202, the types of Wi-Fi devices 204-210, the future use of wireless devices within the premises 200, customer needs or requests, the layout of the premises 200, the building materials of the premises 200, and the like. In general, the testing devices 204-210 may be located anywhere within the premises 200 within a broadcast range of the modem 202. Once activated, the testing Wi-Fi devices 204-210 are ready for testing of the Wi-Fi signal strength within the premises 200 in relation to the modem 202.

Figure 4:
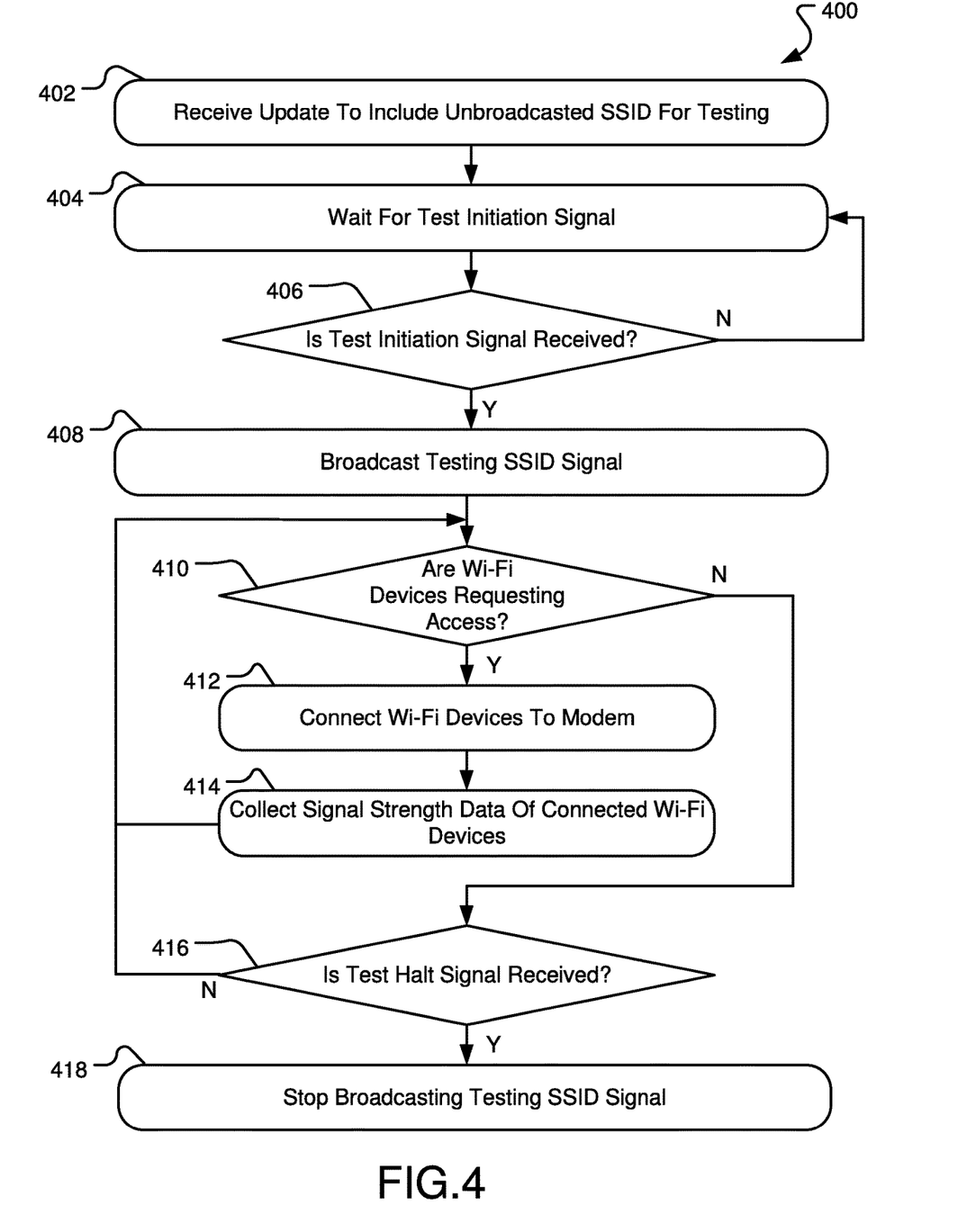
FIG. 4 is a flowchart illustrating a method for executing a test of a distribution of Wi-Fi signals within a local network in accordance with one embodiment.

FIG. 4 is a flowchart illustrating a method 400 for executing a test of a distribution of Wi-Fi signals within a local network in accordance with one embodiment. In particular, the operations of the method 400 may be performed by the modem 202 of the WLAN of the premises 200 through hardware components, software programs, or a combination of hardware and software components. Through the method 400, the Wi-Fi signal strength at the various locations within the premises 200 at which the Wi-Fi testing devices 204-210 are located may be obtained for analysis for the signal strength within the WLAN.

In operation 402, the modem 202 may receive a software update or may otherwise be configured to include a Wi-Fi network broadcast signal associated with a testing SSID. For example, the modem 202 may be connected to network 102 described above and may receive firmware or other software updates from the network 102. The firmware update may include instructions to the modem 202 to add a testing SSID network signal to a list of network identifying signals capable of being broadcast by the modem 202. The testing SSID network signal may also include one or more passwords used by wireless devices to connect and access the modem 202. As explained above, the modem 202 may broadcast an SSID network signal that Wi-Fi or other wireless devices may use to connect to the modem. The update to the modem 202 may instruct the modem to not broadcast the test SSID network signal until a particular input is received at the modem 202. In another example and prior to being installed or otherwise located at the premises 200, the modem 202 may be configured to include the test SSID network signal in a list of available network signals to broadcast, while not broadcasting the test SSID network signal until the initiation signal is received. Thus, in operation 404, the modem 202 may wait for the receipt of the test initiation signal. In some instances, the test initiation signal is transmitted to the modem 202 from the network 102. In other examples, the test initiation signal may be received from a mobile device operated by a technician at the premises 200, such as through the execution of a mobile device application that includes a user interface. The user interface of the application may include a test start button or other activation portion. When the test start button is activated on the mobile device, the application may generate a test initiation signal and transmit the signal to the modem 202. In some instances, the application of the mobile device may have previously logged into or otherwise connected to the modem 202 to exchange instructions and/or commands, such as the test initiation button. In still other examples, the test initiation signal may be received from the network 102 in response to a component of the network receive a test start signal or command from the application of the mobile device, such as through a cellular network.

Regardless of which device or network provides the test initiation signal, the modem 202 may, in operation 406 determine if the test initiation signal has been received. If not, the modem 202 may continue to wait for the test initiation signal. The modem 202 may continue to operate in a normal mode while waiting for the test initiation signal. For example, the modem 202 may connect to wireless devices via an SSID network signal and act as a gateway to provide data and messages between the wireless devices and the network 102/Internet 130. However, the SSID network signal used to connect wireless devices in this mode may be an SSID network other than the test SSID network signal.

If the test initiation signal is determined to be received, the modem 202 may begin broadcasting the test SSID network signal in operation 408 in a similar manner as the modem 202 transmits other SSID network signals. The modem 202 may be configured to transmit one or more SSID network signals to connect to wireless devices. Therefore, the modem 202 may cease broadcasting a previously sent SSID network signals to begin broadcasting the testing SSID signal, or may continue to broadcast the previously sent SSID network signals. By broadcasting the test SSID network signal, the modem 202 may begin to connect Wi-Fi or other wireless devices to exchange communications.

In operation 410, the modem 202 may determine any Wi-Fi devices requesting to connect to the modem 202 on the test SSID network. As mentioned above, the test Wi-Fi devices 204-210 may be configured to automatically attempt to connect to the test SSID network when the test SSID network signal is detected. Therefore, the Wi-Fi devices 204-210 may detect the test SSID network signal once the modem 202 begins broadcasting the test SSID signal. Upon detection, the Wi-Fi devices 204-210 may transmit a connection request signal or command to the modem 202 to connect to the test SSID network. In some instances, the connection request signal may include a password provided to the Wi-Fi devices 204-210 through the update or configuration of the devices. Each of the test Wi-Fi devices 204-210 within the range of the modem 202 (i.e., receiving the broadcasted test SSID network signal) may then transmit the connection request signal to the modem 202.

If the modem 202 determines that one or more Wi-Fi devices 204-210 are requesting connection to the test SSID network, the modem 202 may register the requesting devices in operation 412 and transmit an acceptance signal or command to the registered Wi-Fi devices 204-210. One or more of the connected Wi-Fi devices 204-210 may be configured to obtain and transmit signal strength data and information of the test SSID network. For example, the connected Wi-Fi device 204-210 may measure the strength of the received signal from the modem. In some aspects, the signal strength may be measured in milliwatts (mW), decibels in relation to a milliwatt (dBm), in a Received Signal Strength Signal (RSSI), or any other measurement of wireless signal strength. Regardless of which measurement is used, the connected Wi-Fi devices 204-210 may transmit, to the modem 202, the signal strength at the respective device. Thus, in operation 414, the modem 202 may collect and store the received signal strengths from the connected Wi-Fi devices 204-210 for use in determining a placement of the Wi-Fi devices within the premises 200, as explained in more detail below.

The modem 202 may return to operation 410 to determine if other Wi-Fi devices are requesting connection to the test SSID network upon collection of the signal strength of the connected Wi-Fi devices 204-210. If no additional requests to connect to the network signals are received, the modem 202 may determine, in operation 414, if a signal is received to halt or stop the testing procedure. Similar to the test initiation signal, the halting testing signal may be received from the network, from a mobile device executing a testing application, or from another computing device. If the halt test signal is not received, the modem 202 may continue to wait for additional requests from Wi-Fi devices 204-210 to connect to the test SSID network. However, upon receipt of the halt test signal, the modem 202 may stop broadcasting the test SSID network signal in operation 416 to end the signal strength test procedure. Additional testing of the Wi-Fi signal strength may be conducted following some or all of the operations of the method 400 of FIG. 4.

Figure 5:
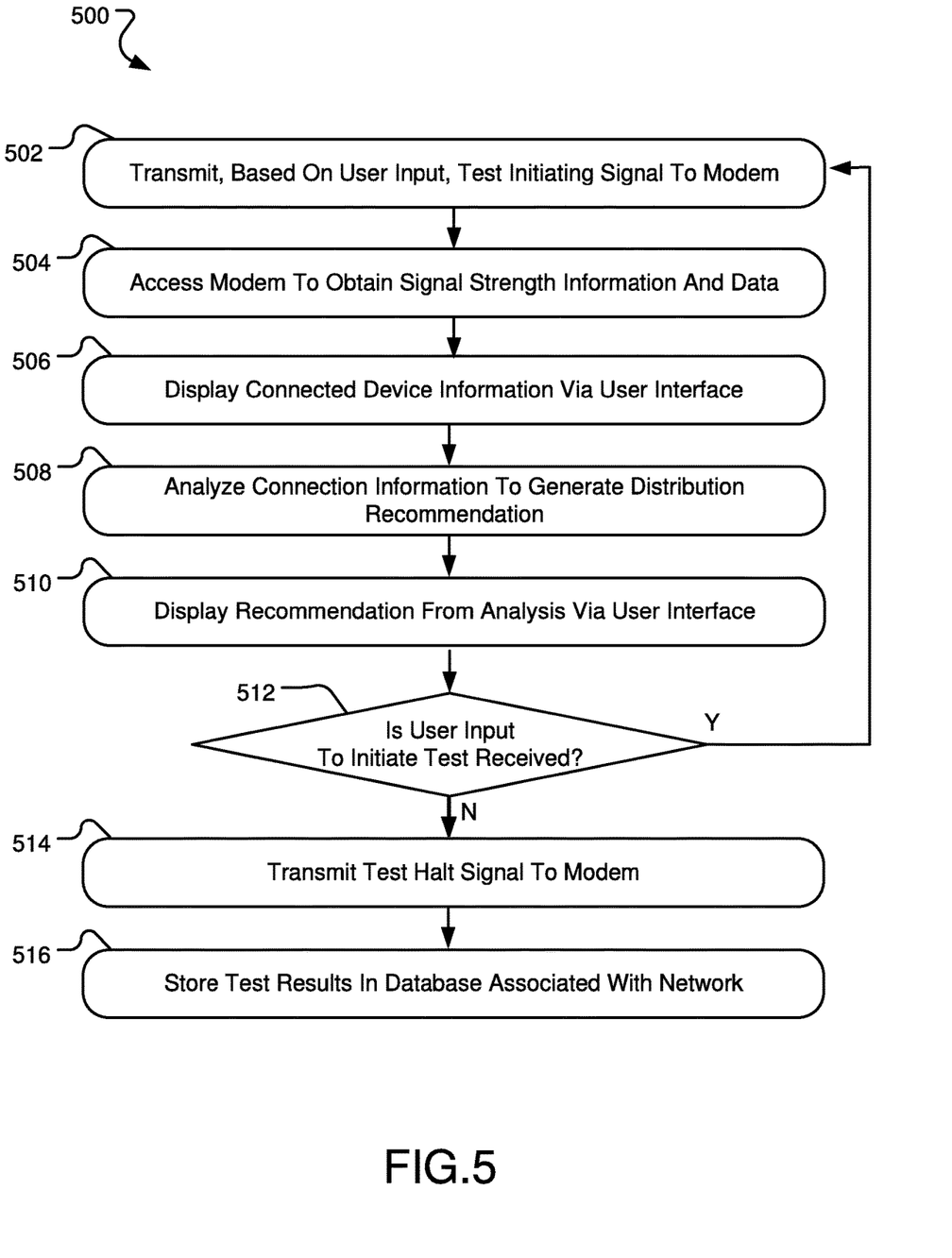
FIG. 5 is a flowchart illustrating a method for utilizing an application to control a test of a distribution of Wi-Fi signals within a local network in accordance with one embodiment.

The signal strength information and data received from the connected Wi-Fi devices 204-210 may be obtained and analyzed to determine the coverage of the modem 202 at the premises 200 and to provide recommendations to a technician or other network administrator to improve the modem 202 coverage. For example, FIG. 5 is a flowchart illustrating a method 500 for utilizing an application to control a test of a distribution of Wi-Fi signals within a local network in accordance with one embodiment. In general, the operations of the method 500 may be performed by an application executed on a computing device, such as a mobile device operated by a technician associated with the premises 200. The application may be executed through a combination of hardware components of the computing device and one or more instructions stored on a computer-readable medium of the device. One example computing device is described below.

In operation 502, the application may transmit the test initiation signal discussed above to the modem 202 or to another computing device that repeats the test initiation signal to the modem 202. The transmission of the test initiation signal may be in response to an input provided to the application by a user of the computing device. In some instances, the input to begin testing may be provided via a user interface displayed on a display device associated with the computing device. The test initiation signal may begin the testing procedure discussed above and provide for the modem 202 to collect the Wi-Fi signal strength information from the various Wi-Fi devices 204-210 installed in the premises 200. In operation 504, the application may access the modem 202 to retrieve or otherwise obtain the signal strength information and data stored at the modem 202. Accessing the modem 202 may include logging into the modem 202, either wired or wirelessly, or accessing a device in communication with the modem 202. In some instances, the application may access the modem 202 via a TR69 connection, Secure Shell (SSH) connection, telnet connection, or any other connecting procedure supported by the modem 202. In operation 506, the application may display at least a portion of the received information and data in a user interface associated with the application. For example, a display device may be associated with the computing device for displaying a user interface of the application. The application may configure the display to thus display some portion of the signal strength data to a user of the application.

Figure 6:
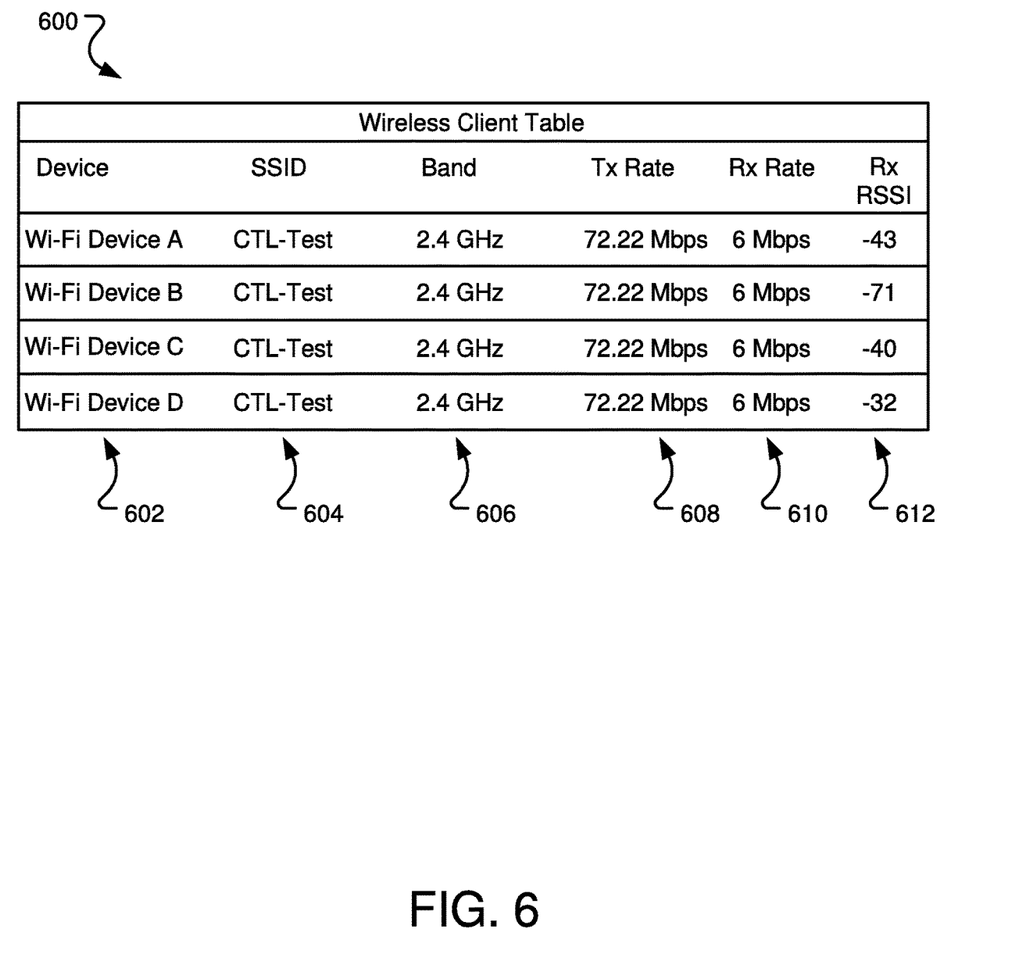
FIG. 6 is an example user interface displaying one or more results from a test of a distribution of Wi-Fi signals within a local network in accordance with one embodiment.

FIG. 6 is one example of a user interface 600 displaying one or more results from a test of a distribution of Wi-Fi signals within a local network in accordance with one embodiment. The user interface 600 may display several aspects of the testing results. For example, the interface 600 may include a device ID column 602 listing each of the Wi-Fi devices 204-210 that connected to the modem 202 during the test. The identification of each of the devices 204-210 may include a device name, a Media Access Control (MAC) address, an IP address, or any other unique identifier. In the example shown, four Wi-Fi devices 204-210 connected to the modem 202 over the test SSID network signal, listed as Wi-Fi Device A-D. An additional column 604 of the interface 600 may list the SSID over which the respective devices connected to the modem 202. In the example shown, each of the devices connected to the modem 202 on "CTL-Test" SSID. The information in this column 604 may be used when the modem 202 broadcasts more than one SSID network signal at a time. The user interface 600 may provide for filtering out of devices that connect to the modem 202 on an SSID network other than the test SSID network.

Several aspects of the connection and signal strength received from the connected devices 204-210 may also be displayed. For example, a frequency band 606 used by the devices to communicate, a transmission rate 608 measured by the devices, and a receiving rate 610 measured by the devices may be displayed. The measurement of signal strength discussed above may also be displayed in column 612. In the example shown, the signal strength is measured in RSSI, which typically ranges from 0 to −255. If the signal strength is measured in other formats, such as mW or dBm, those measurements may also or alternatively be shown in the user interface 600. In some instances, the display 600 may be in displayed in various colors. The colors may indicate a relative signal strength of the corresponding devices 204-210. For example, an RSSI measurement between 0 and −65 may be illustrated in green or other color to indicate a strong or good signal strength, RSSI measurements between −65 and −75 may be illustrated in yellow or other color to indicate a degraded signal strength, and RSSI measurements above −75 may be illustrated in red or other color to indicate a device out of range of the modem 202. In general, any color may be used in displaying the results received from the modem 202. Also, any thresholds within the range of possible measurements may be associated with the various colors illustrated in the user interface 600.

In operation 508, the signal strength data and information may be analyzed by the application to determine locations within the premises 200 with Wi-Fi signal strengths below one or more threshold values. Based on the analysis, one or more recommendations for placement of the modem 202, Wi-Fi devices 204-210, signal repeaters or extenders, signal boosters, etc. may be determined. Further, reports of the analysis of the Wi-Fi device signal strengths may be generated and stored for current and future WLAN coverage consideration. An analysis and recommendation method is discussed in further detail with reference to FIG. 7 below. The results of the analysis performed by the application may be displayed, in operation 510, on the user interface for a user of the application. The results may include recommendations for improving the Wi-Fi coverage from the modem 202 within the premises 200 such that connection to the modem 202 and, subsequently, the network 102 is also improved.

In operation 512, additional testing of the Wi-Fi coverage within the premises 200 may be performed. For example, the provided results in the user interface may recommend the placement of a signal extender in a location with a low signal strength, as determined from the test results. A technician or other person located at the premises 200 may install the signal extender in the recommended location. Upon execution of one or more recommendations, an additional testing of the signal strength of the connected Wi-Fi devices 204-210 may be performed to verify the results of the recommended actions. Another recommendation may include moving the placement of the modem 202 to a more centralized location within the premises 200 such that one or more of the Wi-Fi devices 204-210 may receive an improved Wi-Fi signal. Once relocation of the modem 202 is performed, an additional test may be conducted to verify that the movement of the modem 202 did not degrade the signal strength at one or more of the devices 204-210 below a threshold value. In this manner, any number of signal strength tests may be performed to raise the signal strength of each connected Wi-Fi device 204-210 above a threshold value.

If another test is conducted, an additional user input to initiate a test may be received through the user interface. If the user input is received (as determined in operation 512), the application may return to operation 502 and conduct another test of the Wi-Fi signal strength of the WLAN of the premises 500. If a user input to initiate another test is not received or a user input to halt testing is received, the application may transmit a test halt signal to the modem 202 in operation 514. Similar to the test initiate signal, the test halt signal may be transmitted directly to the modem 202 or through another computing device or network in communication with the modem 202. In operation 516, the application may store the received test results in the computing device or provide the test results to another storage device. When storing, the results may be associated with some indicator or indicators of the premises 200, the modem 202, the Wi-Fi devices 204-210, a technician associated with the test, the network 102 connected to the modem 202, and/or any other information associated with the WLAN test and the components included in the WLAN test. This information may be used by a network administrator to provide additional recommendations, improvements, and general troubleshooting of the WLAN of the premises 200.

Figure 7:
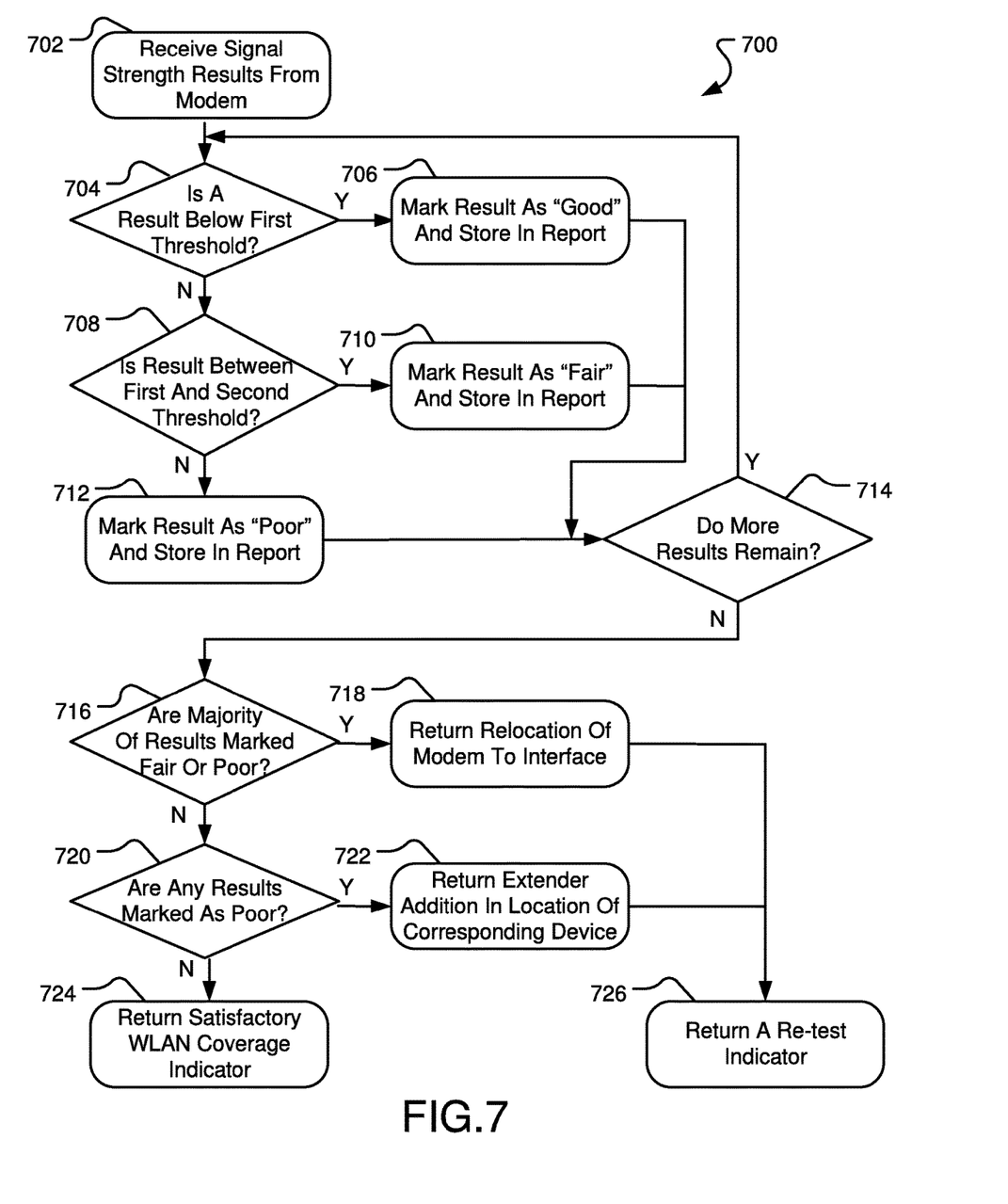
FIG. 7 is a flowchart illustrating a method for generating a recommendation for distribution of Wi-Fi devices within a local network based on a test of Wi-Fi signal strength in accordance with one embodiment.

FIG. 7 is a flowchart illustrating a method for generating a recommendation for distribution of Wi-Fi devices within a local network based on a test of Wi-Fi signal strength in accordance with one embodiment. In general, the operations of the method 700 may be performed by an application executed on a computing device, such as a mobile device operated by a technician associated with the premises 200. The application may be executed through a combination of hardware components of the computing device and one or more instructions stored on a computer-readable medium of the device. One example computing device is described below.

In operation 702, the application may receive the Wi-Fi signal strength results from the testing procedures described above. In some instances, the results may include the signal strength reported by several Wi-Fi devices 204-210 located around the premises 200. In operation 704, the application may, for a first signal strength result of the multiple results, determine if the result is below a first threshold value. As mentioned above, the Wi-Fi signal strength result for a Wi-Fi device 204 may be received as an RSSI value ranging from 0 to −255. Thus, the first threshold value may be some RSSI value, such as a −65 RSSI value. For signal strengths reported by the device 204 in other measurements, such as mW or dBm, the first threshold value may correspond to the scale in which the signal strength is provided. The first threshold value may be any value as determined or selected by the application based on the configuration of the application. Continuing the above example, if the application determines that the RSSI value for the signal strength result is below (or in some instances, equal to) the first threshold value, the application may mark the result as "Good" or "Adequate" or some other identifier to indicate that the Wi-Fi signal strength at the corresponding device is acceptable for the WLAN and/or premises 200 in operation 706. For example, the application may determine that a received RSSI signal strength from Wi-Fi device 204 is −43 and is below the first threshold value of −65. In this example, the result from Wi-Fi device 204 may be marked as good. The indication of the signal strength, the determination of the quality of the signal, and/or any other information obtained from the modem 202 or determined by the application may be stored in operation 706.

If the Wi-Fi signal strength result is above the first threshold value, the application may determine in operation 708 if the result is between the first threshold value and a second threshold value. This determination may be similar to the determination of the result in comparison to the first threshold value. In one example, the second threshold value may be a −75 RSSI value, although any value and/or measurement scale may determine the second threshold value. If the result is between the first and the second threshold values, the application may mark the result, in operation 710, as "Fair" or some other identifier to indicate that the Wi-Fi signal strength at the corresponding device is acceptable but weak for the WLAN and/or premises 200. Again, the indication of the signal strength, the determination of the quality of the signal, and/or any other information obtained from the modem 202 or determined by the application may be stored in a report of the test results.

If the result is not below the first threshold or between the first and second threshold, the application may mark the result, in operation 712, as "Poor" or some other identifier to indicate that the Wi-Fi signal strength at the corresponding device is unacceptable for the WLAN and/or premises 200. The indication of the signal strength, the determination of the quality of the signal, and/or any other information obtained from the modem 202 or determined by the application may be stored in a report of the test results following the marking of the result as "poor" or other indicator.

Regardless of the marker associated with the result, the application may determine, in operation 714, if more results from the list of Wi-Fi signal strength results remain or have not been marked by the application. If more results remain, the application may return to operation 704 to mark the next result in the list. However, if each result has been marked or otherwise classified, the application may determine, in operation 716, if the majority of the results are classified as fair or poor. If the majority of results indicate a fair or poor Wi-Fi signal strength, the application may provide, return, or display in the user interface a recommendation to relocate the modem 202 within the premises, preferably to a more centralized location within the premises 200 or amid the Wi-Fi devices 204-210. On the other hand, if a majority of the results do not indicate a fair or poor Wi-Fi signal strength, the application may determine, in operation 720, if any of the results are marked or classified as poor or above the second threshold value. For those results classified as poor, the application may provide, return, or display in the user interface a recommendation to add or install a signal extender (or similar device) in an area that corresponds to a Wi-Fi device associated with the poor signal strength. For example, Wi-Fi device C 208 may provide a signal strength result to the modem 202 that is classified as "poor" or above the second threshold value. In response, the application may note the poor signal strength and recommend the installation of an extender in the kitchen 222 area of the premises 200 to improve the signal strength in that area. In some instances, the application may include the areas within the premises 200 associated with each of the Wi-Fi devices 204-210 such that the recommendation may include an indication of the affected area. In other instances, a user of the application may correspond a low or poor signal strength with a particular area of the premises 200 and install the extender in that area. If it is determined that none of the results are classified as poor, the application may return a satisfactory indicator for the WLAN coverage within the premises 200 as each of the signal strengths of the tested Wi-Fi devices 204-210 is within an acceptable value or level.

In some instances, multiple signal strength tests may be conducted on the WLAN of the premises 200. In particular, the application may display or otherwise provide a recommendation to re-test the devices 204-210 of the WLAN following the execution of one or more of the recommendations, in operation 726. For example, upon relocating the modem 202 to a different area of the premises 200, an additional test of the Wi-Fi devices 204-410 may be conducted to determine the results of the relocation of the modem 202. Similarly, an additional test of the Wi-Fi devices 204-210 may be conducted following the installation of a signal extender to verify the extender improves the signal strength of one or more of the devices 204-210 above the poor classification.

Figure 8:
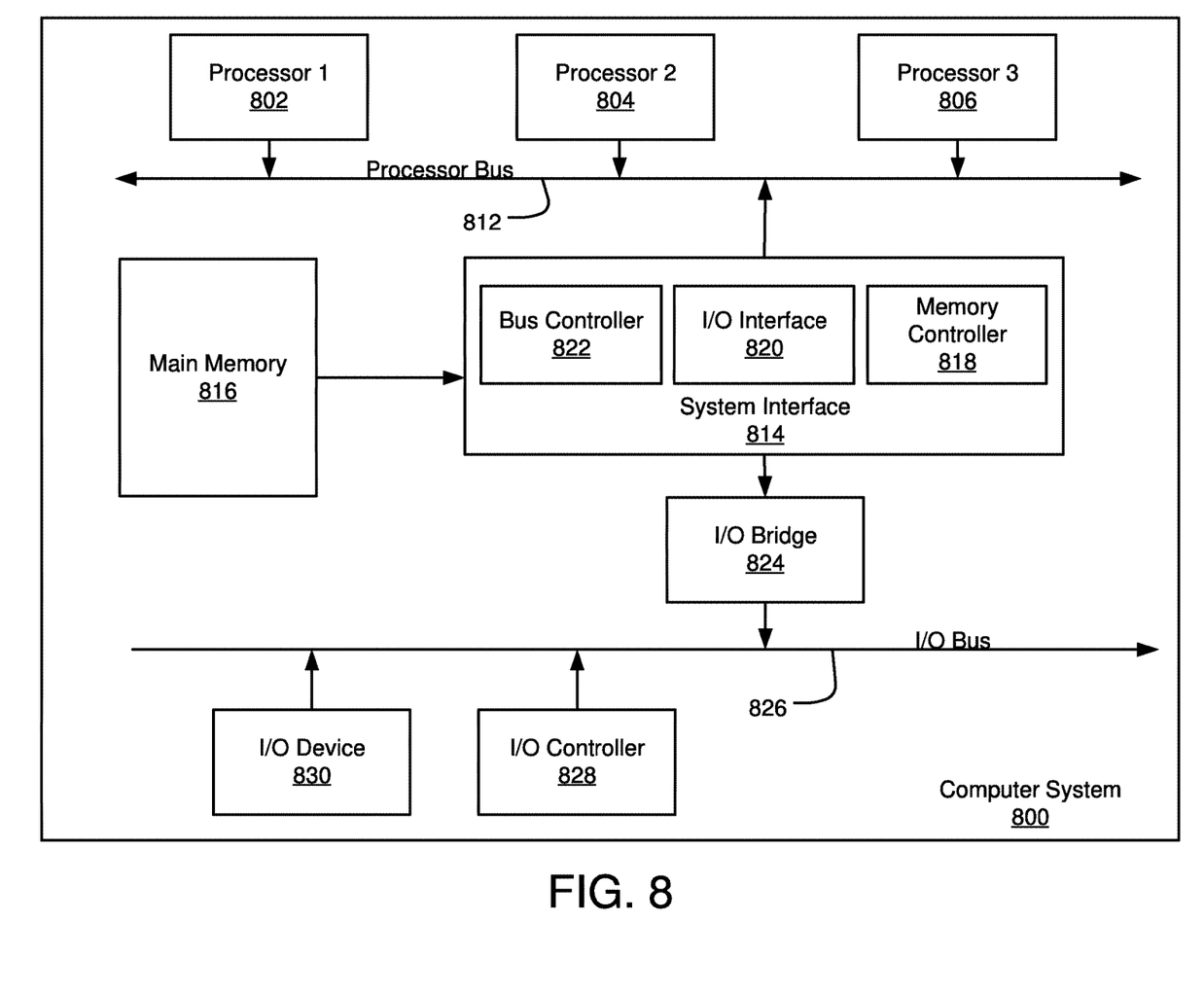
FIG. 8 is a diagram illustrating an example of a computing system which may be used in implementing embodiments of the present disclosure.

FIG. 8 is a block diagram illustrating an example of a computing device or computer system 800 which may be used in implementing the embodiments of the components of the network disclosed above. For example, the computing system 800 of FIG. 8 may be the computing device on which the application discussed above is executed. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 814 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for operating a wireless network, the method comprising:
   receiving, by a wireless network device via a network server, a test wireless network identifier and a password for connecting to a test wireless network;
   broadcasting, by a wireless network device upon receiving a test initiation signal and based on the test wireless network identifier, a test wireless network signal within a premises;
   communicating, by a wireless network device upon receiving the password, with a test wireless device via the test wireless network signal;
   obtaining, by a wireless network device from the test wireless device, transmission data of the test wireless device over the test wireless network signal;
   transmitting, by a wireless network device to a mobile device and based on a request from an application of the mobile device, the transmission data of the test wireless device; and
   configuring, by the wireless network device, the test wireless device to automatically transmit the password in response to detection of the test wireless network signal.

2. The method of claim 1, wherein the application of the mobile device is configured to:
   generate, based on the transmission data of the test wireless device, a wireless network installation action; and
   display, on a display device associated with the mobile device, an indication of the wireless network installation action.

3. The method of claim 2, wherein the wireless network installation action comprises an installation of a wireless network extender device.

4. The method of claim 1, wherein the transmission data comprises Received Signal Strength Signal (RSSI) data.

5. The method of claim 1, further comprising:
   associating the transmission data of the test wireless device with an indicator of the premises; and
   transmitting, to a network storage device, the associated transmission data of the test wireless device and the indicator of the premises.

6. A wireless network device comprising:
   one or more processors;
   a wireless transmitter/receiver in communication with the one or more processors; and
   a memory comprising instructions that, when executed by the one or more processors, perform the operations of:
      detecting, from a wireless network broadcasting device, a test wireless network signal comprising a test wireless network identifier;
      transmitting, via the wireless transmitter/receiver and to the wireless network broadcasting device, connection credentials associated with the test wireless network identifier to connect to the test wireless network signal;
      measuring a signal strength of the test wireless network signal based on receiving one or more test communications via the test wireless network signal;
      transmitting the signal strength of the test wireless network signal to the wireless network broadcasting device; and
      configuring, by the wireless network device, the test wireless device to automatically transmit the connection credentials in response to detection of the test wireless network signal.

7. The wireless network device of claim 6, the instructions further performing the operations of:
   accessing the wireless network broadcasting device; and
   receiving, from the wireless network broadcasting device, a plurality of signal strengths associated with a plurality of wireless devices in communication with the wireless network broadcasting device.

8. The wireless network device of claim 7, the instructions further performing the operations of:
   generating, based on the plurality of signal strengths associated with the plurality of wireless devices, a wireless network installation action; and
   displaying, on a display device, an indication of the wireless network installation action.

9. The wireless network device of claim 8, the instructions further performing the operation of:
   classifying the plurality of signal strengths associated with the plurality of wireless devices, the wireless network installation action based on the classification of the plurality of signal strengths associated with the plurality of wireless devices.

10. The wireless network device of claim 8, the instructions further performing the operation of:

correlating, with the plurality of signal strengths associated with the plurality of wireless devices, information of a premises associated with the wireless network broadcasting device.

11. The wireless network device of claim 10 wherein the wireless network installation action comprises an indication of a location within the premises for installation of the wireless network broadcasting device.

12. The wireless network device of claim 10 wherein the wireless network installation action comprises an installation of a wireless network extender device.

13. The wireless network device of claim 6, the instructions further performing the operation of:
transmitting, to the wireless network broadcasting device, a test initiation communication, the wireless network broadcasting device transmitting the test wireless network identifier in response to the test initiation communication.

14. The wireless network device of claim 6 wherein the signal strength of the test wireless network signal comprises Received Signal Strength Signal (RSSI) data.

15. A wireless network system comprising:
a wireless broadcasting device broadcasting, based on a test initiation signal, a test wireless network signal;
a wireless device automatically transmitting, upon detection of the test wireless network signal, one or more credential information to the wireless broadcasting device to connect to the test wireless network signal and to transmit a measured signal strength of the test wireless network signal received at the wireless device; and
a mobile device communicating with the wireless broadcasting device to obtain measured signal strength of the test wireless network signal received at the wireless device and to display the measured signal strength on a display device associated with the mobile device.

16. The wireless network system of claim 15, the mobile device further transmitting, in response to an input received via the display device, a test initiating signal to the wireless broadcasting device, the wireless broadcasting device transmitting the test wireless network identifier in response to the test initiation communication.

17. The wireless network system of claim 15, the mobile device further classifying, based on a signal strength threshold value, the measured signal strength of the test wireless network signal and generating, based on the classification of the measured signal strength of the test wireless network signal, a wireless network installation action.

18. The wireless network system of claim 17 wherein the wireless network installation action comprises an indication of a location within the premises for installation of the wireless network broadcasting device.

19. The wireless network system of claim 17 wherein the wireless network installation action comprises an installation of a wireless network extender device.

* * * * *